United States Patent
Wang et al.

(10) Patent No.: US 10,427,904 B2
(45) Date of Patent: Oct. 1, 2019

(54) METHOD FOR PRODUCING FILM AND METHOD FOR WINDING OFF FILM

(71) Applicant: Sumitomo Chemical Company, Limited, Chuo-Ku, Tokyo (JP)

(72) Inventors: Jian Wang, Daegu (KR); Tatsuya Kataoka, Niihama (JP); Hideyuki Hamamura, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 278 days.

(21) Appl. No.: 15/386,786

(22) Filed: Dec. 21, 2016

(65) Prior Publication Data
US 2017/0174460 A1  Jun. 22, 2017

(30) Foreign Application Priority Data
Dec. 22, 2015 (JP) .................. 2015-250570

(51) Int. Cl.
*B65H 35/02* (2006.01)
*B65H 23/032* (2006.01)

(52) U.S. Cl.
CPC ..... *B65H 23/0326* (2013.01); *B65H 23/0328* (2013.01); *B65H 35/02* (2013.01); *B65H 2301/41501* (2013.01); *B65H 2301/414322* (2013.01); *B65H 2301/5155* (2013.01); *B65H 2801/72* (2013.01)

(58) Field of Classification Search
CPC .......................... B65H 35/02; B65H 23/0326; B65H 23/0328; B29C 59/02; B29C 59/00
USPC ......................................................... 264/146
See application file for complete search history.

(56) References Cited

U.S. PATENT DOCUMENTS

| | | | |
|---|---|---|---|
| 7,687,012 B2 | 3/2010 | Daniels et al. | |
| 2002/0132161 A1* | 9/2002 | Kelsey | H01M 2/0255 429/82 |
| 2002/0132162 A1* | 9/2002 | Takata | B26D 1/025 429/129 |
| 2010/0012764 A1* | 1/2010 | Pirtle | B65H 18/10 242/520 |
| 2014/0374947 A1* | 12/2014 | Ichinomiya | B29D 99/005 264/175 |

FOREIGN PATENT DOCUMENTS

| | | | | |
|---|---|---|---|---|
| JP | 2004182434 A | 7/2004 | | |
| WO | 2013/099539 A1 | 7/2013 | | |
| WO | WO-2013099539 A1 * | 7/2013 | ........... | B29C 55/005 |

OTHER PUBLICATIONS

Office Action dated Jan. 10, 2019 in U.S. Appl. No. 15/385,236, by Kon.

* cited by examiner

*Primary Examiner* — Nahida Sultana
*Assistant Examiner* — Debjani Roy
(74) *Attorney, Agent, or Firm* — Panitch Schwarze Belisario & Nadel LLP (57) ABSTRACT

The separator production method in accordance with an embodiment of the present invention includes a coated article winding off step of winding off, from a core, a separator original sheet which has been taken up in a coated article taking up step of winding the separator original sheet on an outer peripheral surface of the core while oscillating the core in a rotation axis direction, and the core is oscillated in the rotation axis direction in the coated article winding off step.

5 Claims, 6 Drawing Sheets

METHOD FOR PRODUCING FILM AND METHOD FOR WINDING OFF FILM

This Nonprovisional application claims priority under 35 U.S.C. § 119 on Patent Application No. 2015-250570 filed in Japan on Dec. 22, 2015, the entire contents of which are hereby incorporated by reference.

TECHNICAL FIELD

The present invention relates to a method for producing a film and a method for winding off a film.

BACKGROUND ART

A method for producing a film includes various processes such as winding off and taking up of a film which serves as a base material. With regard to a production of a film, Patent Literature 1 discloses a technique to take up a film while causing oscillation. Moreover, Patent Literature 2 discloses a technique in which a wide web roll which has been taken up while being oscillated is slit into narrow webs and the narrow webs are taken up into respective rolls.

CITATION LIST

Patent Literature

[Patent Literature 1]
International Publication No. 2013/099539 (Publication date: Jul. 4, 2013)
[Patent Literature 2]
Japanese Patent Application Publication Tokukai No. 2004-182434 (Publication date: Jul. 2, 2004)

SUMMARY OF INVENTION

Technical Problem

However, in a case where a film is taken up while being oscillated, the film is wound on a core in a state where the film is distorted in a wavelike manner in a transverse direction. Therefore, in the conventional techniques, there is a problem that the film is wound off in a state of being distorted in the transverse direction.

The present invention is accomplished in view of the problem, and its object is to provide a method for producing a film and a method for winding off a film with which methods the film can be wound off with reduced distortion of the film in the transverse direction.

Solution to Problem

In order to attain the object, a method for producing a film in accordance with an aspect of the present invention includes the steps of: taking up a film by winding the film on an outer peripheral surface of a core while oscillating the core in a rotation axis direction; and winding off the film, which has been taken up in the taking up step, from the core, in the winding off step, the core being oscillated in the rotation axis direction.

In order to attain the object, in the method for winding off a film in accordance with an aspect of the present invention, a film, which has been taken up so as to be wound on an outer peripheral surface of a core while the core is being oscillated in a rotation axis direction, is wound off while the core is being oscillated in the rotation axis direction.

Advantageous Effects of Invention

According to an aspect of the present invention, it is possible to bring about an effect of providing a method for producing a film and a method for winding off a film with which methods the film can be wound off with reduced distortion of the film in the transverse direction.

BRIEF DESCRIPTION OF DRAWINGS

Each of (a) through (c) of FIG. 2 is a diagram schematically illustrating a state of the lithium-ion secondary battery illustrated in FIG. 1.

Each of (a) and (b) of FIG. 3 is a diagram schematically illustrating a state of a lithium-ion secondary battery having another configuration.

(a) of FIG. 6 is a cross-sectional view illustrating a roll obtained by the coated article taking up step shown in FIG. 5. (b) of FIG. 6 is an enlarged view illustrating a surface of a heat-resistant separator original sheet in a dotted-line frame shown in (a) of FIG. 6. (c) of FIG. 6 is a reference diagram illustrating a surface of a heat-resistant separator original sheet which has been taken up without oscillating a core in the coated article talking up step.

(a) and (b) of FIG. 7 schematically illustrate respective of a coated article winding off step and a slitting step shown in FIG. 4.

DESCRIPTION OF EMBODIMENTS

The following description will discuss an embodiment of the present invention with reference to FIGS. 1 through 7. In the present embodiment, an example case is described in which the method for producing a film in accordance with an aspect of the present invention is applied to a production of a separator for a lithium-ion secondary battery (hereinafter, sometimes referred to as "separator").

First, the lithium-ion secondary battery will be discussed with reference to FIGS. 1 through 3.

[Configuration of Lithium Ion Secondary Battery]

A nonaqueous electrolyte secondary battery, typically, a lithium-ion secondary battery has a high energy density, and therefore, is currently widely used not only as batteries for use in devices such as personal computers, mobile phones, and mobile information terminals, and for use in moving bodies such as automobiles and airplanes, but also as stationary batteries contributing to stable power supply.

Figure 1:
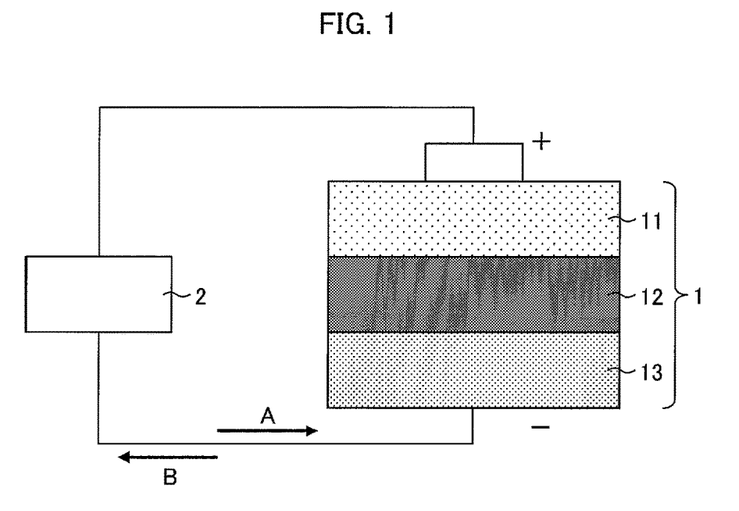
FIG. 1 is a diagram schematically illustrating a cross sectional configuration of a lithium-ion secondary battery.

FIG. 1 is a diagram schematically illustrating a cross sectional configuration of a lithium-ion secondary battery 1. As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 (film) is provided so as to be sandwiched between the cathode 11 which is a positive electrode of the lithium-ion secondary battery 1 and the anode 13 which is a negative electrode of the lithium-ion secondary battery 1. The separator 12 separates the cathode 11 and the anode 13, allowing lithium ions to move between the cathode and the anode 13. For example, polyolefin such as polyethylene or polypropylene is used as a material of the separator 12.

Figure 2:
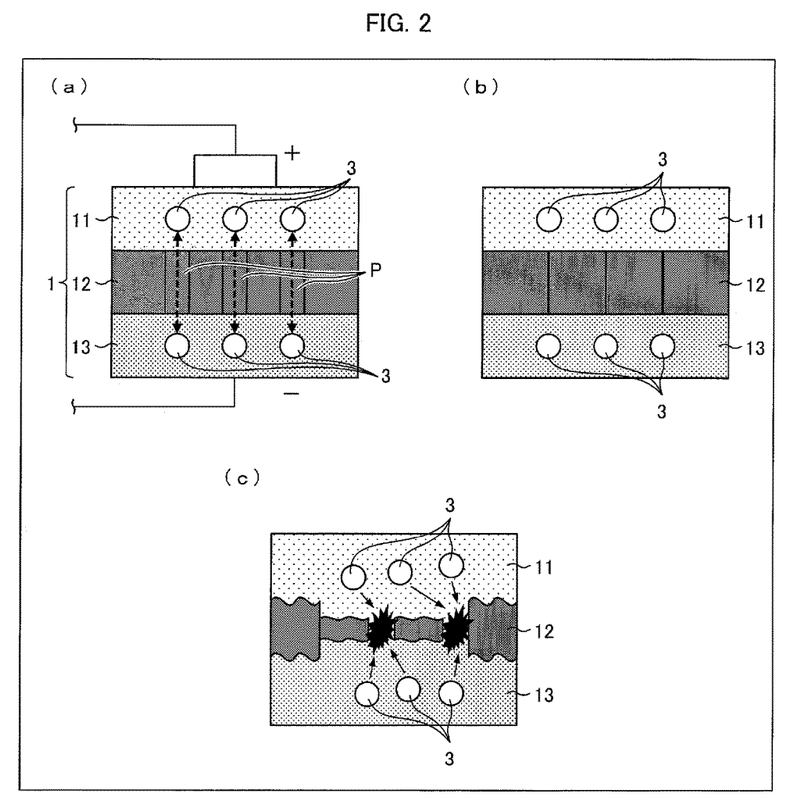

Each of (a) through (c) of FIG. 2 schematically illustrates a state of the lithium-ion secondary battery 1 illustrated in FIG. 1. (a) of FIG. 2 illustrates a normal state. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device 2, or the like. In such cases, the separator 12 melts or softens and the pores P are blocked as illustrated in (h) of FIG. 2. As a result, the separator 12 shrinks. This stops the back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving back and forth. Consequently, the temperature continues rising.

(Heat-Resistant Separator)

Figure 3:
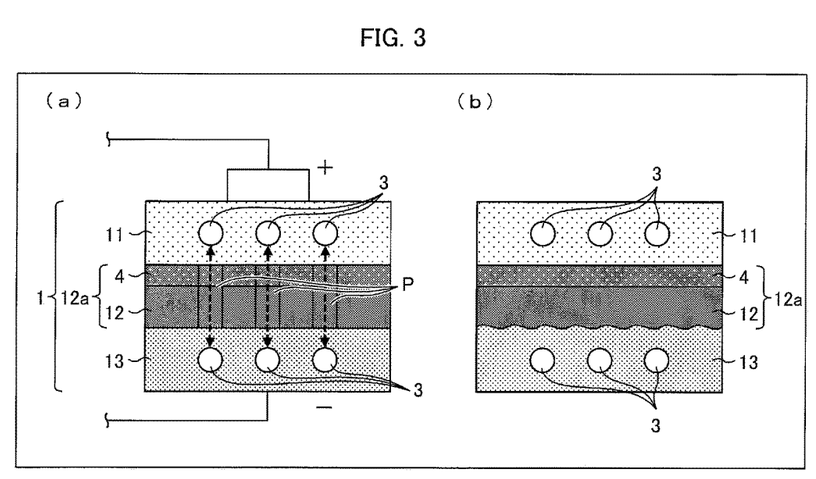

Each of (a) and (b) of FIG. 3 schematically illustrates a state of a lithium-ion secondary battery 1 having another configuration. (a) of FIG. 3 illustrates a normal state, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer (functional layer) 4. The heat-resistant layer 4 can be provided to the separator 12. (a) of FIG. 3 illustrates a configuration in which the separator 12 is provided with the heat-resistant layer 4 serving as a functional layer. A film in which the separator 12 is provided with the heat-resistant layer 4 is hereinafter referred to as a heat-resistant separator (film) 12a.

In the configuration illustrated in (a) of FIG. 3, the heat-resistant layer 4 is laminated on a surface of the separator 12 which surface is on a cathode 11 side. Note that the heat-resistant layer 4 can alternatively be laminated on a surface of the separator 12 which surface is on an anode 13 side, or both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops the back-and-forth movement of the lithium ions 3 and consequently stops the above-described excessive discharging or excessive charging. In this way, the separator 12 can be prevented from being destroyed.

[Flow for Producing Separator]

The following description will discuss a flow for producing a separator.

Figure 4:
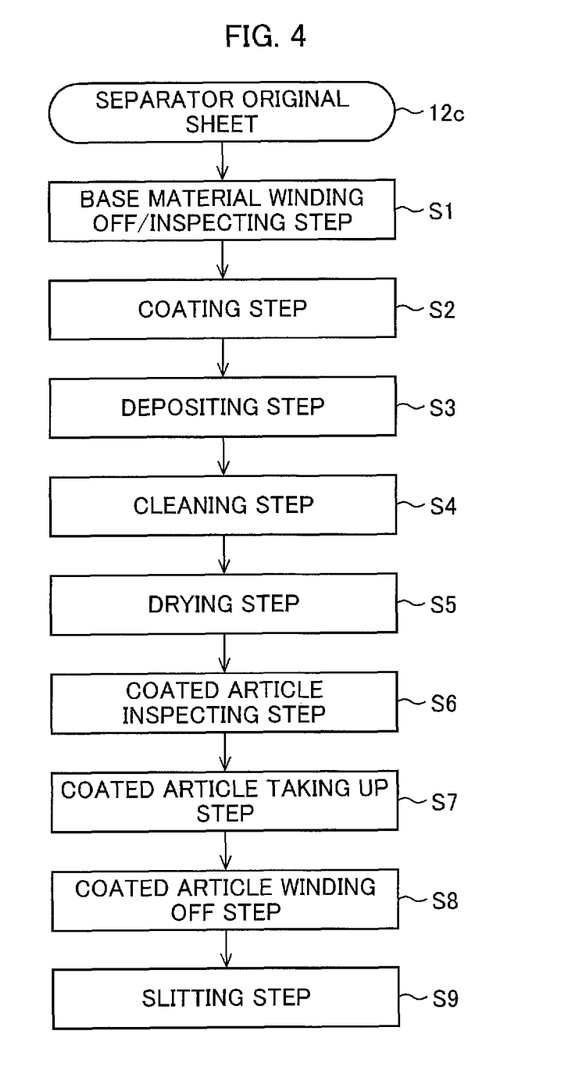
FIG. 4 is a flow chart schematically showing a method for producing a separator.

FIG. 4 is a flow chart schematically showing a method for producing a separator. The separator is configured such that a functional layer is laminated on an original sheet of a separator (hereinafter, referred to as "separator original sheet") which original sheet serves as a base. A film made of polyolefin or the like is used for the separator original sheet. Examples of the functional layer encompass a heat-resistant layer and an adhesive layer.

The functional layer is laminated on the separator original sheet by (i) coating the separator original sheet with coating (a material) or the like corresponding to the functional layer and then (ii) drying the separator original sheet.

FIG. 4 shows, as an example, a flow for producing the heat-resistant separator 12a in a case where the functional layer is the heat-resistant layer 4. The flow shown in FIG. 4 is an example of a flow in which wholly aromatic polyamide (aramid resin) employed as a material for the heat-resistant layer 4 is laminated on a polyolefin base film which is a separator original sheet (film) 12c.

The above flow includes a base material winding off/inspecting step S1, a coating step S2, a depositing step S3, a cleaning step S4, a drying step S5, a coated article inspecting step S6, a coated article taking up step (taking up step) S7, a coated article winding off step (winding off step, method for winding off a film) S8, and a slitting step S9.

(Production Step of Producing Base Material)

First, the following description will discuss production of the separator original sheet 12c serving as a base material, by using, as an example, a case where the separator original sheet 12c mainly contains polyethylene as a material.

The following description will discuss, as an example, a production method for producing the separator original sheet 12c in which production method a thermoplastic resin in which a pore forming agent is added is shaped into a film and then the pore forming agent is removed by use of an appropriate solvent. Specifically, in a case where a polyethylene resin containing an ultra-high molecular weight polyethylene is used as a material of the separator original sheet 12c, steps (A) through (II)) below are sequentially carried out in the production method.

(A) Kneading Step

A step of obtaining a polyethylene resin composition by kneading an ultra-high molecular weight polyethylene and an inorganic filler such as a calcium carbonate.

(B) Rolling Step

A step of forming a film by use of the polyethylene resin composition obtained in the kneading step.

(C) Removal Step

A step of removing the inorganic filler from the film obtained in the rolling step.

(D) Stretching Step

A step of obtaining the separator original sheet 12c by stretching the film obtained in the removal step.

According to the above production method, in the removal stop (C), many fine pores are provided in the film. The fine pores of the film stretched in the stretching step (D) become the above-described pores P. The separator original sheet 12c formed as a result is a polyethylene microporous film having a prescribed thickness and a prescribed air permeability.

In the kneading step (A), 100 parts by weight of the ultra-high molecular weight polyethylene, 5 parts by weight to 200 parts by weight of a low molecular weight polyolefin having a weight-average molecular weight of not more than 10000, and 100 parts by weight to 400 parts by weight of the inorganic filler can be kneaded.

Note that even in a case where the separator original sheet 12c contains another material, the separator original sheet 12c can be produced by similar production steps. The method for producing the separator original sheet 12c is not limited to the method in which the pore forming agent is removed, and various methods can be used for producing the separator original sheet 12c.

The following description will sequentially discuss the steps S1 through S9 which are subsequent to the production step of producing the separator original sheet 12c. Note that the steps S1 through S9 are carried out in this order.

(Base Material Winding Off/Inspecting Step S1)

The base material winding off/inspecting step S1 is a step of winding off, from a roll, the separator original sheet 12c which is a base material for a function-provided separator. Further, the base material winding off/inspecting step S1 is a step of inspecting the separator original sheet 12c, which has been wound off, before carrying out the subsequent coating step.

(Coating Step S2)

The coating step S2 is a step of coating, with coating (a material) for the heat-resistant layer 4, a separator original sheet 12c which has been wound off in the base material winding off/inspecting step S1. In the coating step S2, it is possible to carry out the coating with respect to only one surface of the separator original sheet 12c or both surfaces of the separator original sheet 12c.

For example, in the coating step S2, the separator original sheet 12c is coated with a solution in which aramid is dissolved in NMP (N-methyl-pyrrolidone), as coating for the heat-resistant layer. Note that the heat-resistant layer 4 is not limited to an aramid heat-resistant layer. For example, it is possible to coat the separator original sheet 12c with a suspension of alumina, carboxymethyl cellulose, and water, as the coating for the heat-resistant layer.

A method for coating the separator original sheet 12c with the coating is not specifically limited as long as uniform wet coating can be performed with respect to the separator original sheet 12c by the method, and various methods can be employed.

For example, it is possible to employ any of the methods such as a capillary coating method, a slit die coating method, a spray coating method, a dip coating method, a roll coating method, a screen printing method, a flexo printing method, a bar coater method, a gravure coater method, or a die coater method.

A material for the heat-resistant layer 4 with which material the separator original sheet 12c is coated has a film thickness that can be controlled by adjusting a thickness of a coating wet film and a solid-content concentration in the coating solution.

In the coating step S2, the separator original sheet 12c is preferably coated so that surfaces of respective both edge parts of the separator original sheet 12c in a transverse direction of the separator original sheet 12c are left uncoated as uncoated parts (edge-uncoated coating). Note that the transverse direction is a direction that is substantially perpendicular to the machine direction and the thickness direction of the separator original sheet 12c.

This can prevent the coating from flowing around from a front surface at the both edge parts of the separator original sheet 12c to a back surface of the separator original sheet 12c, unlike in a case where an entire surface coating is carried out so that the coating is applied to the separator original sheet 12c so as to cover up to the surfaces of the respective both edge parts of the separator original sheet 12c. Accordingly, it is possible to reduce a product defect which is caused when the coating flows around to the back surface of the separator original sheet 12c. In a case where the edge-uncoated coating has been carried out, the uncoated parts can be removed in the slitting step S9 which will be described later.

(Depositing Step S3)

The depositing step S3 is a step of solidifying the coating with which the separator original sheet 12c has been coated in the coating step S2. In a case where the coating is an aramid coating, for example, water vapor is applied to a coated surface so that aramid is solidified by humidity deposition. This provides a heat-resistant separator original sheet 12b (see FIG. 5) in which the heat-resistant layer 4 is formed on the separator original sheet 12c.

(Cleaning Step S4)

The cleaning step S4 is a step of cleaning the heat-resistant separator original sheet 12b in which the coating has been solidified in the depositing step S3. In a case where the heat-resistant layer 4 is an aramid heat-resistant layer, for example, water, an aqueous solution, or an alcohol-based solution is suitably used as a cleaning liquid.

Note that the cleaning step S4 can be multistage cleaning in which cleaning is carried out a plurality of times in order to enhance a cleaning effect.

Moreover, after the cleaning step S4, a water removing step can be carried out for removing water from the heat-resistant separator original sheet 12b which has been cleaned in the cleaning step S4. A purpose of the water removing is to remove water or the like that is attached to the heat-resistant separator original sheet 12b before the subsequent drying step S5 so that drying can be carried out more easily and insufficient drying can be prevented.

(Drying Step S5)

The drying step S5 is a step of drying the heat-resistant separator original sheet 12b that has been cleaned in the cleaning step S4. A method for drying the heat-resistant separator original sheet 12b is not particularly limited, and, for example, it is possible to use various methods such as a method in which the heat-resistant separator original sheet 12b is brought into contact with a heated roller or a method in which hot air is blown onto the heat-resistant separator original sheet 12b.

(Coated Article Inspecting Step S6)

The coated article inspecting step S6 is a step of inspecting the heat-resistant separator original sheet 12b which has been dried in the drying step S5. In the inspection, a defect is marked as appropriate, and it is therefore possible to efficiently inhibit the heat-resistant separator original sheet 12b from having a defect.

(Coated Article Taking Up Step S7)

The coated article taking up step S7 is a step of taking up the heat-resistant separator original sheet 12b, which has been subjected to the coated article inspecting step S6, on a core having a cylindrical shape. The heat-resistant separator original sheet 12b which has been taken up on the core can be directly shipped or the like as an original sheet in a state of having a larger width.

Figure 5:
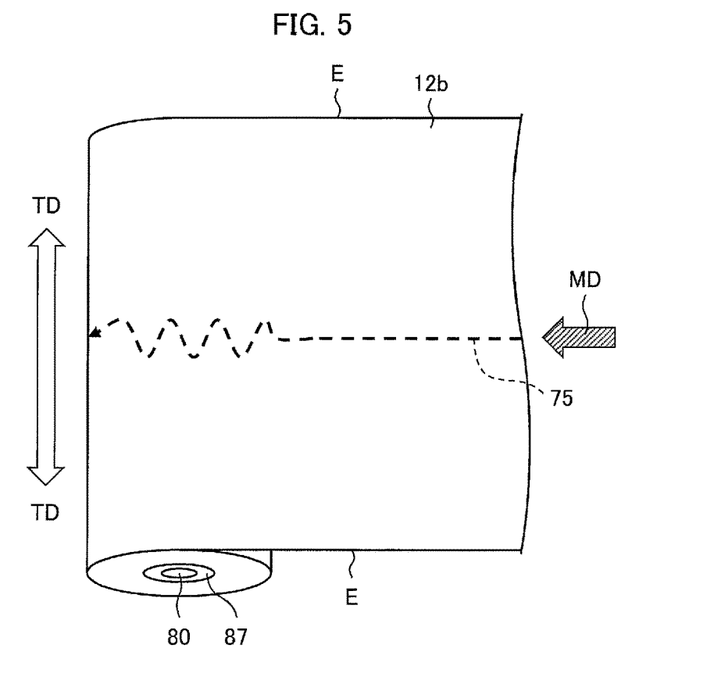
FIG. 5 is a top surface view illustrating an example of a coated article taking up step shown in FIG. 4.

FIG. 5 is a top surface view illustrating an example of the coated article taking up step S7 Shown in FIG. 4. Not that, in FIG. 5, "MD" indicates a machine direction (i.e., transferring direction) of the heat-resistant separator original sheet 12b.

As illustrated in FIG. 5, in the coated article taking up step S7, the heat-resistant separator original sheet 12b is wound on an outer peripheral surface of the core 87 having a cylindrical shape while the core 87 is oscillated in a rotation axis direction (hereinafter, sometimes referred to as a transverse direction TD (i.e., width direction) of a separator) of the core 87. With the configuration, even in a case where a thickness unevenness 75 is caused along the machine direction of the heat-resistant separator original sheet 12b, it is possible to take up the heat-resistant separator original sheet 12b on the core 87 while dispersing the thickness unevenness 75 in the transverse direction TD. This makes it possible to improve planarity of the surface of the heat-resistant separator original sheet 12b which is in a state of being wound on the outer peripheral surface of the core 87.

Figure 6:
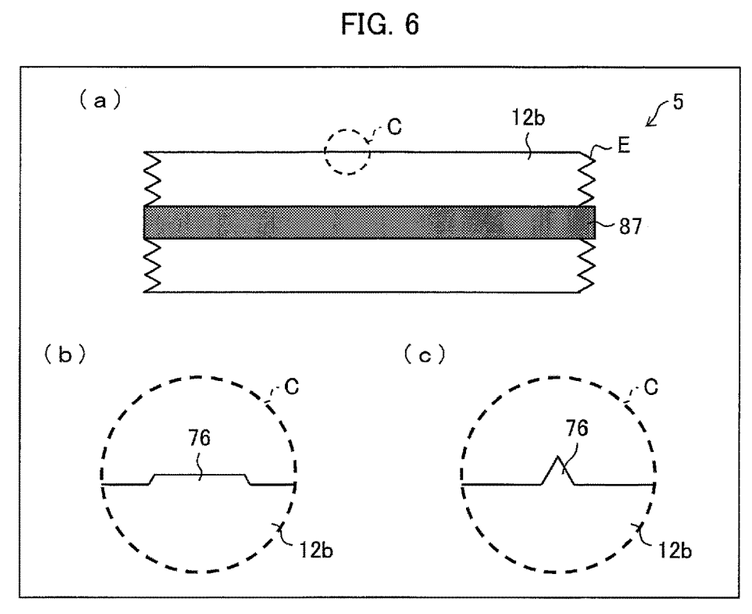

(a) of FIG. 6 is a cross-sectional view illustrating a roll 5 obtained in the coated article taking up step S7. (b) of FIG. 6 is an enlarged view illustrating a state of a surface of the heat-resistant separator original sheet 12b in a dotted-line frame C shown in (a) of FIG. 6. (c) of FIG. 6 is a reference diagram illustrating a state of the surface of the heat-resistant separator original sheet 12b which has been taken up without oscillating the core 87 in the coated article taking up step S7.

The roll 5 is a roll of the heat-resistant separator original sheet 12b which is wound on the outer peripheral surface of the core 87 so as to be laminated.

In a case where the heat-resistant separator original sheet 12b is taken up on the core 87 while the core 87 is oscillated in the transverse direction TD, the heat-resistant separator original sheet 12h is wound on the core 87 while being cyclically distorted in a wavelike manner in the transverse direction TD.

Therefore, as illustrated in (a) of FIG. 6, in the roll 5 obtained in the coated article taking up step S7, end parts E of the heat-resistant separator original sheet 12b are not aligned straight but are distorted in accordance with an amplitude of the core 87.

In the coated article taking up step S7, the heat-resistant separator original sheet 12b is taken up on the core 87 while the thickness unevenness 75 which is caused along the machine direction of the heat-resistant separator original sheet 12b is dispersed in the transverse direction TD. In this case, the position of the thickness unevenness 75 in the heat-resistant separator original sheet 12b, which has been taken up, is dispersed by a distance corresponding to the entire amplitude of the core 87 (i.e., half amplitude×2). Therefore, as illustrated in (b) of FIG. 6, it is possible to lower a protrusion 76 on the surface of the heat-resistant separator original sheet 12b which protrusion 76 occurs due to the thickness unevenness 75.

On the other hand, in the coated article taking up step S7, if the heat-resistant separator original sheet 12b is taken up while the core 87 is not oscillated, the position of the thickness unevenness 75 in the heat-resistant separator original sheet 12b which has been taken up does not change. In such a case, as illustrated in (c) of FIG. 6, the protrusion 76 caused clue to the thickness unevenness 75 is emphasized and becomes larger, as the number of times of winding the heat-resistant separator original sheet 12b increases.

As such, in the coated article taking up step S7, the heat-resistant separator original sheet 12b is taken up while the core 87 is oscillated in the transverse direction TD of the heat-resistant separator original sheet 12b, and this makes it possible to improve planarity of the surface of the heat-resistant separator original sheet 12b that has been wound into the roll 5.

A method for oscillating the core 87 in the transverse direction TD is not limited to a particular one and can be, for example, a method in which an oscillation device including a motor, an oil hydraulic cylinder, and the like is employed and a first take-up roller 80 that is provided inside the core 87 so as to pierce through the core 87 is oscillated in the transverse direction TD.

An oscillation pattern in which the core 87 is oscillated in the transverse direction TD is not limited to a particular one and is preferably an oscillation pattern in which the heat-resistant separator original sheet 12b is oscillated without imbalance when averaged in the machine direction of the heat-resistant separator original sheet 12b. The oscillation pattern of the core 87 may include a constant speed but is preferably an oscillation pattern in which a moving speed becomes lower as the core 87 approaches a point at which a moving direction in back-and-forth motion changes.

The amplitude of the core 87 in the coated article taking up step S7 is preferably 1 mm or more and 30 mm or less. With the amplitude of the core 87 which amplitude is set to fall within the above range, it is possible to suitably bring about an effect of improving the planarity of the surface of the heat-resistant separator original sheet 12b which has been wound into the roll 5.

Moreover, in the coated article taking up step S7, an oscillation cycle of the core 87 is preferably, for example, 2 seconds (s) or more and 180 seconds (s) or less, and a transferring speed (taking-up speed) of the heat-resistant separator original sheet 12b is preferably, for example, 0.01 m/s or more and 5 m/s or less. By setting the oscillation cycle of the core 87 and the transferring speed to fall within the above ranges in the coated article taking up step S7, it is possible to take up the heat-resistant separator original sheet 12b while maintaining productivity of products without applying an excessive load to the heat-resistant separator original sheet 12b.

(Coated Article Winding Off Step S8)

The coated article winding off step S8 is a step of wind off the heat-resistant separator original sheet 12b from the roll 5 which has been obtained in the coated article taking up step S7. In the coated article winding off step S8, the heat-resistant separator original sheet 12b is wound off from the core 87 while the core 87 is oscillated in the transverse direction TD. This makes it possible to wind off the heat-resistant separator original sheet 12b so that the heat-resistant separator original sheet 12b becomes straighter in the machine direction MD. Note that details of the coated article winding off step S8 will be described later.

(Slitting Step S9)

The slitting step S9 is a step of slitting (cutting) the heat-resistant separator original sheet 12b wound off in the coated article winding off step S8 into parts each having a predetermined product width. Specifically, in the slitting step S9, the heat-resistant separator original sheet 12b is slit into parts each having a product width which is suitable for an applied product such as the lithium-ion secondary battery 1.

In order to increase productivity, the heat-resistant separator original sheet 12b is usually produced so as to have a width that is equal to or greater than the product width. After the heat-resistant separator original sheet 12b is produced with a width equal to or greater than the product width, the heat-resistant separator original sheet 12b is slit into heat-resistant separators 12a each having the product width.

(Details of Coated Article Winding Off Step S8)

Figure 7:
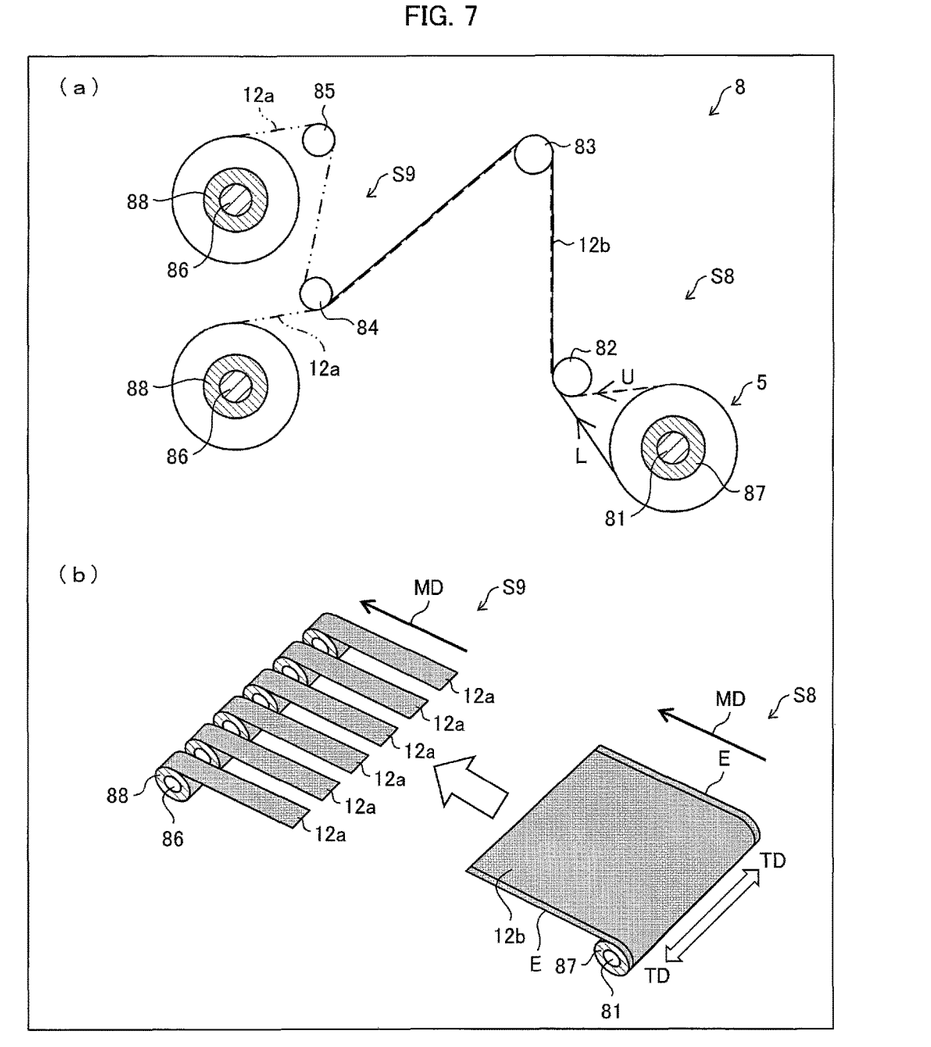

(a) and (b) of FIG. 7 respectively schematically illustrate examples of the coated article winding off step S8 and the slitting step S9 shown in FIG. 4.

As illustrated in (a) of FIG. 7, the coated article winding off step S8 and the slitting step S9 are carried out by the winding-off/slitting apparatus 8.

The winding-off/slitting apparatus 8 includes a wind-off roller 81, rollers 82 through 85, and a plurality of second take-up rollers 86 each of which (i) has a columnar shape and (ii) is rotatably supported. The winding-off/slitting apparatus 8 further includes a plurality of blades (not illustrated). The roll 5 is fitted on the wind-off roller 81.

As early described, in the roll 5, the heat-resistant separator original sheet 12b is wound on the core 87 so as to be laminated in a state of being distorted in a wavelike manner in the transverse direction TD. Therefore, in the coated article winding off step S8, if the heat-resistant separator original sheet 12b is wound off while the core 87 is not oscillated in the transverse direction TD, the heat-resistant separator original sheet 12b is to be transferred to the slitting step S9 in the state of being distorted in a wavelike manner in the transverse direction TD. In this case, the heat-resistant separator original sheet 12b includes edge parts (both end parts E) which are distorted in a wavelike manner in the transverse direction TD and cannot be used as products, and this leads to deterioration in productivity of products.

As illustrated in (a) and (b) of FIG. 7, in the coated article winding off step S8, the heat-resistant separator original sheet 12b is wound off while the core 87 is oscillated in the transverse direction TD.

Specifically, in the coated article winding off step S8, the oscillation of the core 87 is controlled so that distortion, in the transverse direction TD, of the heat-resistant separator original sheet 12b which has been wound off becomes smaller.

For example, an edge detection device which detects positions of the end parts E of the heat-resistant separator original sheet 12b which has been wound off is provided immediately after a winding-off position on a transferring path, and the oscillation of the core 87 is subjected to feedback control carried out based on information detected by the edge detection device.

Alternatively, the oscillation of the core 87 can be controlled by (i) obtaining oscillation information (such as oscillation cycle, amplitude, phase) in the coated article taking up step S7 and (ii) inputting the information to an oscillation device that is used in the coated article winding off step S8.

With the configuration, it is possible to wind off the heat-resistant separator original sheet 12b while cancelling the distortion of the heat-resistant separator original sheet 12b in the transverse direction TD and making the heat-resistant separator original sheet 12b straighter. Therefore, when the heat-resistant separator original sheet 12b is slit in the subsequent slitting step S9, it is possible to reduce, in the heat-resistant separator original sheet 12b, a width of a wavelike edge part which is distorted in the transverse direction TD (fluctuation width) in each of the both end parts E and cannot be used as a product. This makes it possible to inhibit deterioration in productivity of products.

It is preferable that the amplitude and the oscillation cycle of the core 87 in the coated article winding off step S8 are set to be identical with the amplitude and the oscillation cycle of the core 87 in the coated article taking up step S7.

This makes it possible to wind off the heat-resistant separator original sheet 12b while appropriately cancelling the distortion of the heat-resistant separator original sheet 12b in the transverse direction TD.

A method for oscillating the core 87 in the transverse direction TD is not limited to a particular one and can be, for example, a method in which an oscillation device including a motor, an oil hydraulic cylinder, and the like is employed and a wind-off roller 81 that is provided inside the core 87 so as to pierce through the core 87 is oscillated in the transverse direction TD.

In the coated article winding off step S8, the heat-resistant separator original sheet 12b is wound off from the core 87 to a path U or a path L. The heat-resistant separator original sheet 12b thus wound off is transferred to the roller 84 via the roller 83. In a step of transferring the heat-resistant separator original, sheet 12b, the heat-resistant separator original sheet 12b is slit substantially parallel to the machine direction MD. As a result, a plurality of heat-resistant separators 12a, into which the separator original sheet 12c has been slit so as to have the product width, are produced.

The plurality of heat-resistant separators 12a thus produced are wound on respective cores 88 fitted on the second take-up rollers 86.

[Main Points]

As above described, the method in accordance with the present embodiment for producing a separator includes: the coated article taking up step S7 of taking up the heat-resistant separator original sheet 12b by winding the heat-resistant separator original sheet 12b on an outer peripheral surface of the core 87 while oscillating the core 87 in the rotation axis direction (transverse direction TD); and the coated article winding off step S8 of winding off the heat-resistant separator original sheet 12b, which has been taken up in the coated article taking up stop S7, from the core 87, in the coated article winding off step S8, the core 87 being oscillated in the rotation axis direction (transverse direction TD).

In a case where the heat-resistant separator original sheet 12b which has been wound on the outer peripheral surface of the core 87 while the core 87 is oscillated in the rotation axis direction is wound off, in general, the heat-resistant separator original sheet. 12h is wound off in a state of being distorted in a wavelike manner in the transverse direction TD.

According to the method for producing a separator in accordance with the present embodiment, the oscillation of the core 87 is appropriately controlled in the coated article winding off step S8, and it is therefore possible to wind off the heat-resistant separator original sheet 12b while cancelling the distortion of the heat-resistant separator original sheet 12b in the transverse direction TD.

Therefore, according to the present embodiment, it is possible to provide the separator production method in which it is possible to wind off the heat-resistant separator original sheet 12b in the coated article winding off step S8 while reducing the distortion of the heat-resistant separator original sheet 12b in the transverse direction TD.

In the present embodiment, the method for producing a film in accordance with an aspect of the present invention has been described with reference to the example in which the film production method is applied to production of a separator for a lithium-ion secondary battery. Note, however, that the present invention is not limited to this example. The method for producing a film in accordance with an aspect of the present invention is also applicable to production of various films other than the separator for a lithium-ion secondary battery.

[Remarks]

The method for producing a film in accordance with an aspect of the present invention includes the steps of: taking up a film by winding the film on an outer peripheral surface of a core while oscillating the core in a rotation axis direction; and winding off the film, which has been taken up in the taking up step, from the core, in the winding off step, the core being oscillated in the rotation axis direction.

In a case where a film which has been wound on an outer peripheral surface of a core while the core is oscillated in a rotation axis direction is wound off, in general, the film is wound off in a state of being distorted in a wavelike manner in a transverse direction of the film (i.e., in the rotation axis direction of the core).

According to the configuration in accordance with an aspect of the present invention, the oscillation of the core is appropriately controlled in the winding off step, and it is thus possible to wind off the film while cancelling the distortion.

Therefore, according to the configuration in accordance with an aspect of the present invention, it is possible to provide the method for producing a film with which method the film can be wound off with reduced distortion of the film in the transverse direction.

In the method for producing a film in accordance with an aspect of the present invention, it is preferable that, in the taking up step, the film being wound on the core so as to be laminated in a state where the film is distorted in a wavelike manner in the rotation axis direction; and in the winding off step, oscillation of the core is controlled so that distortion of the film which has been wound off becomes smaller.

According to the configuration, oscillation of the core is controlled so that the distortion of the film which has been wound off in the winding off step becomes smaller, and this makes it possible to wind off the film in the winding off step so that the film becomes straighter.

In the method for producing a film in accordance with an aspect of the present invention, it is preferable that an oscillation cycle and an amplitude of the core in the winding off step are identical with respective of an oscillation cycle and an amplitude of the core in the taking up step.

According to the configuration, the oscillation cycle and the amplitude of the core in the winding off step are set to be identical with the oscillation cycle and the amplitude of the core in the taking up step. It is therefore possible to wind off the film while appropriately cancelling the distortion.

Therefore, according to the configuration, it is possible to wind off the film in the winding off step so that the film appropriately becomes straighter.

In the method for producing a film in accordance with an aspect of the present invention, it is preferable that, in the winding off step, a position of an end part of the film, which has been wound off, in a transverse direction is detected, and oscillation of the core is controlled based on information thus detected.

According to the configuration, it is possible to carry out feedback control of oscillation of the core based on a result of detecting the end part of the film, which has been wound off, in the transverse direction so that the distortion of the film becomes smaller.

Therefore, according to the configuration, it is possible to wind off the film in the winding off step so that the film becomes straighter.

The method for producing a film in accordance with an aspect of the present invention preferably further includes the step of slitting the film, which has been wound off in the winding off step, into parts each of which has a predetermined product width.

According to the configuration, the film which has been wound off in the winding off step with the reduced distortion is introduced to the slitting step. Therefore, when the film is slit in the slitting step, it is possible to reduce a width of a wavelike part (fluctuation width) which is in each of both end parts of the film in the transverse direction and cannot be used as a product.

Therefore, according to the configuration, it is possible to reduce deterioration in productivity of products.

In the method for producing a film in accordance with an aspect of the present invention, it is possible that a functional layer is provided on at least one of a front surface and a back surface of the film.

An aspect of the present invention is applicable to a film which includes a functional, layer that is provided on at least one of a front surface and a back surface of the film.

According to the configuration, it is possible to wind off the film, on which the functional layer is provided, while reducing the distortion.

In the method for winding off a film in accordance with an aspect of the present invention, a film, which has been taken up so as to be wound on an outer peripheral surface of a core while the core is being oscillated in a rotation axis direction, is wound off while the core is being oscillated in the rotation axis direction.

As above described, in a case where a film which has been wound on an outer peripheral surface of a core while the core is oscillated in a rotation axis direction is wound off, in general, the film is wound off in a state of being distorted in a wavelike manner in the rotation axis direction of the core (i.e., in a transverse direction of the film).

According to the configuration, the oscillation of the core is appropriately controlled, and it is therefore possible to wind off the film while cancelling the distortion.

Therefore, according to the configuration, it is possible to provide the method for winding off a film with which method the film can be wound off with reduced distortion of the film in the transverse direction.

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

1: Lithium-ion secondary battery
4: Heat-resistant layer (functional layer)
12: Separator (film)
12*a*: Heat-resistant separator (film)
12*b*: Heat-resistant separator original sheet (film)
12*c*: Separator original sheet (film)
87: Core
S7: Coated article taking up step (taking up step)
S8: Coated article winding off step (winding off step, method for winding off a film)
S9: Slitting step
E: End part
TD: Transverse direction (rotation axis direction)

The invention claimed is:

1. A method for producing a film, said method comprising the steps of:

taking up a film by a first step of winding the film on an outer peripheral surface of a core while oscillating the core in a rotation axis direction, such that the film is in a state of being distorted in a wavelike manner in the rotation axis direction; and a second step of winding off the film, which has been taken up in the taking up step and which is in the state of being distorted in the wavelike manner in the rotation axis direction, from the core, wherein in the second winding off step, the core is oscillated in the rotation axis direction and in the second winding off step, oscillation of the core is controlled so that distortion of the film which has been wound off becomes smaller.

2. The method as set forth in claim 1, wherein:

an oscillation cycle and an amplitude of the core in the second winding off step are identical with respect to an oscillation cycle and an amplitude of the core in the taking up step.

3. The method as set forth in claim 1, wherein:

in the second winding off step, a position of an end part of the film, which has been wound off, in a transverse direction is detected, and oscillation of the core is controlled based on information thus detected.

4. The method as set forth in claim 1, further comprising the step of:

slitting the film, which has been wound off in the second winding off step, into parts each of which has a predetermined product width.

5. The method as set forth in claim 1, wherein:

a functional layer is provided on at least one of a front surface and a back surface of the film.

* * * * *